US006145908A

United States Patent [19]
Deb et al.

[11] Patent Number: 6,145,908
[45] Date of Patent: Nov. 14, 2000

[54] ENERGY ABSORBING CONTINUOUSLY COMPLIANT SWEPT ARCH FOR INTERIOR TRIM

[75] Inventors: Anindya Deb, Dearborn; Nripen Kumar Saha, Ann Arbor; Stephen Matthew Calso, West Bloomfield, all of Mich.

[73] Assignee: Ford Global Technologies, Inc., Dearborn, Mich.

[21] Appl. No.: 09/075,898

[22] Filed: May 11, 1998

[51] Int. Cl.[7] ..................................................... B60R 21/04
[52] U.S. Cl. .......................... 296/39.1; 296/189; 280/751
[58] Field of Search .................................. 289/189, 39.1; 280/751, 798, 752

[56] References Cited

U.S. PATENT DOCUMENTS

| | | |
|---|---|---|
| 3,779,595 | 12/1973 | Suzuik et al. . |
| 4,033,623 | 7/1977 | Thary et al. . |
| 5,362,102 | 11/1994 | Hajek et al. ............................. 280/751 |
| 5,382,051 | 1/1995 | Glance . |
| 5,419,606 | 5/1995 | Hull et al. ............................. 296/146.7 |
| 5,433,478 | 7/1995 | Naruse . |
| 5,564,744 | 10/1996 | Frost . |
| 5,573,272 | 11/1996 | Teshima . |
| 5,575,500 | 11/1996 | Mimura et al. .......................... 280/751 |
| 5,660,426 | 8/1997 | Sugimori et al. ....................... 296/189 |
| 5,709,407 | 1/1998 | Stephens ................................ 280/751 |
| 5,720,510 | 2/1998 | Daniel et al. . |
| 5,762,392 | 6/1998 | Suga ....................................... 296/39.1 |
| 5,791,716 | 8/1998 | Takagi et al. ........................... 296/39.1 |

FOREIGN PATENT DOCUMENTS 40 15 375 A1   11/1991   Germany .

*Primary Examiner*—Joseph D. Pape
*Attorney, Agent, or Firm*—David B. Kelley

[57] ABSTRACT

An energy absorbing trim assembly 16 for covering an inner face of structural member 28 of a vehicle defining a passenger compartment having elongated wall portion 18 with a longitudinal axis. Wall portion 18 positionable in a covering relationship over structural member inner face 28. A plurality of swept arch members 20 are arrayed along longitudinal axis 19 in a laterally spaced relationship with respect to structural member inner face 28. Arch members 20 are elastically deformable in response to imposition of a load substantially normal to the structural member inner face 28 and plastically deformable upon contact with structural member inner face 28 to further distribute the load. Energy absorbing pedestal members 22,22' provide for the mounting of energy absorbing trim assembly 16 to a structural member inner face 28. Pedestals 22,22' are plastically deformable in response to imposition of a load substantially normal to a structural member 12. Pedestals 22,22' act in combination with swept arch members 20 to further reduce the magnitude of acceleration and thereby aid in protection of vehicle occupants.

15 Claims, 2 Drawing Sheets

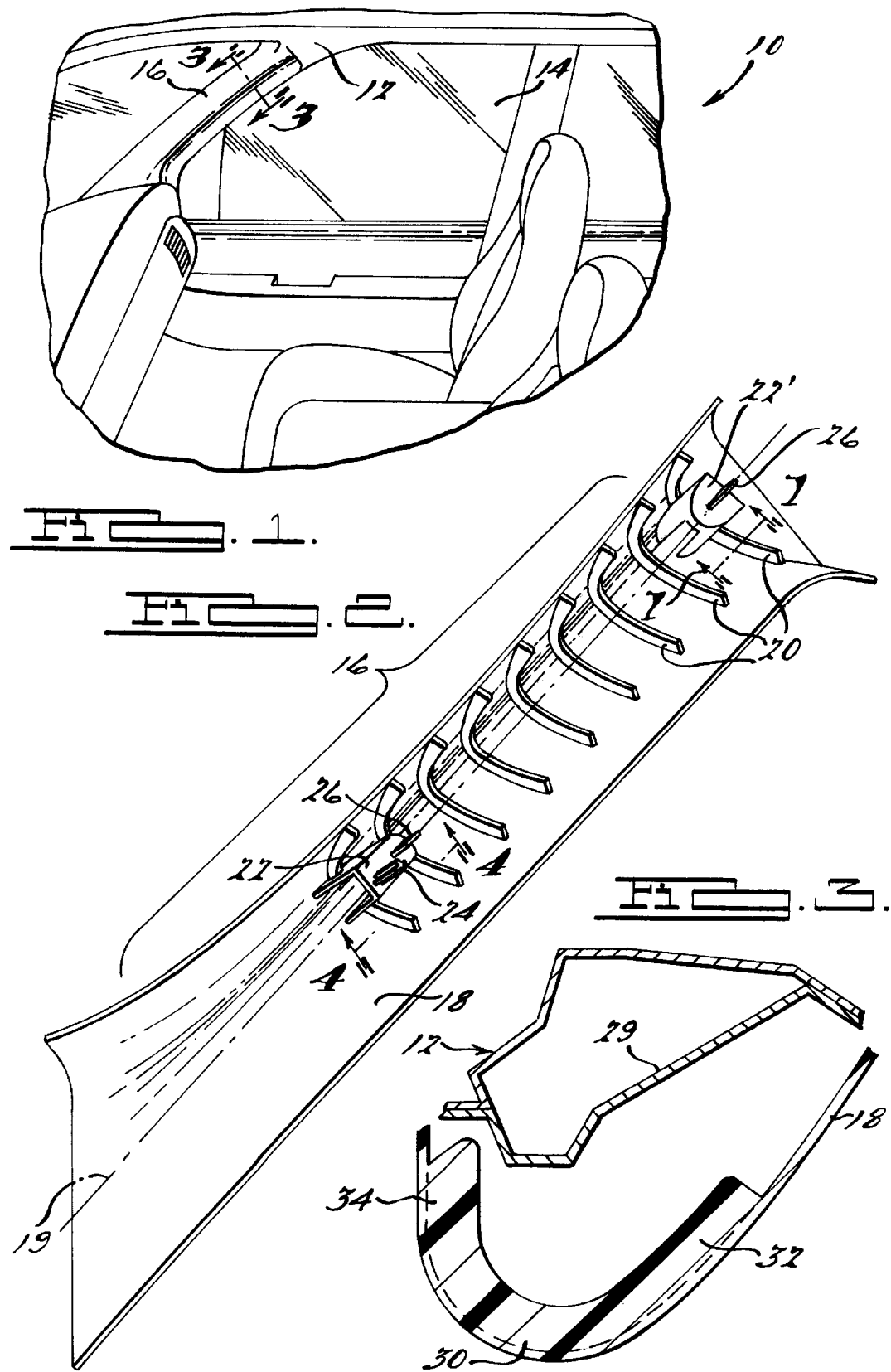

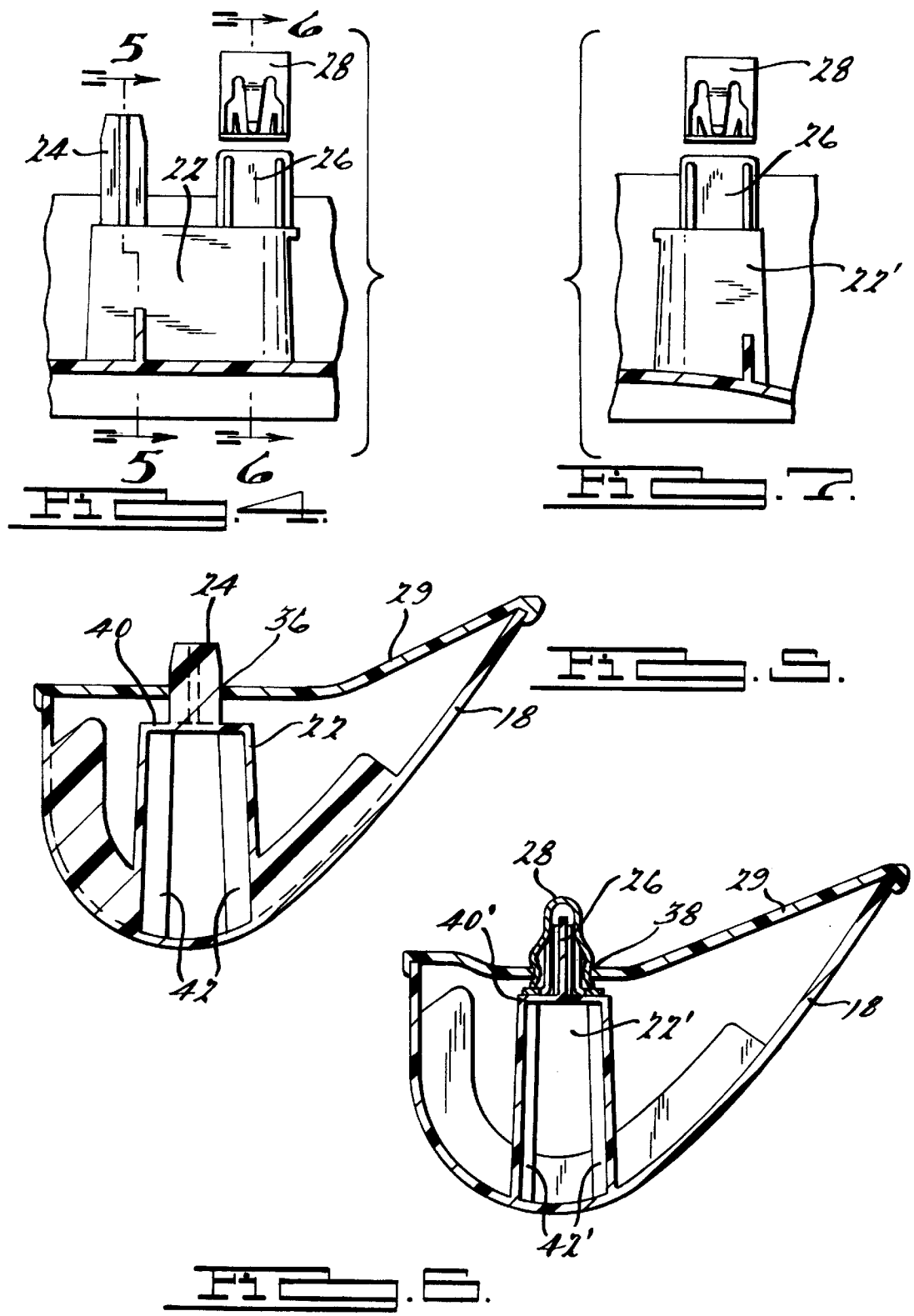

ENERGY ABSORBING CONTINUOUSLY COMPLIANT SWEPT ARCH FOR INTERIOR TRIM

BACKGROUND OF THE INVENTION

1. Technical Field

The present invention relates to interior trim components for a vehicle, and more particularly to such interior trim which covers structural members and provides an integrally molded swept arch structure to absorb impact energy.

2. Description of Related Art

It is known to provide trim molding to cover structural members in a vehicle interior. Pillars, headers, roof side rails, and other structural components are commonly covered by injected molded plastic material to provide an aesthetic appeal to a vehicle interior. It is further know to provide trim pieces which are configured to offer some impact protection to vehicle occupants in the event of a collision.

Daniel et al., U.S. Pat. No. 5,720,510, which is assigned to the assignee of the present invention, discloses an energy absorbing pillar structure. Daniel teaches a stack of independent crush chambers with the media. The energy absorbing media includes either C-shaped members, beam-like members, or plastic honeycomb structures.

Frost, U.S. Pat. No. 5,564,744, discloses an energy absorbing trim component including an energy absorbing longitudinally continuous tube-like or coil-like member between a trim cover and a structural member. Frost further discloses longitudinal or lateral slots cut into the tube-like member to tune the level of kinetic energy absorption. However, due to the shape of the energy absorption member, Frost disadvantageously requires a relatively large volume of space surrounding the structural member to be fully effective. Moreover, Frost fails to take advantage of any energy absorption capability of the trim cover itself. The trim cover is treated as a wholly separate piece and only functions as a aesthetic cover to conceal the actual energy absorption member.

Baym, German Patent No. 4,015,375, provides pillar crash protection by locating a multi-segment internal wall defining hollow chambers on a base member between an aesthetic layer and a structural member. Baym essentially teaches crushable chambers overlying vehicle structure. As the chambers are fully operable only when acting in direct relation to the structural member, they disadvantageously fail to provide protection from a large range of impact angles.

It is therefore desirable to provide a light weight trim molding which is elastically and plastically deformable in response to imposition of a load while occupying the minimum amount of space within the vehicle interior. It is further desirable to provide a trim molding which can be specifically tailored to accommodate a large range of impact angles and structural components. It is still further desirable to provide a trim molding which is simple to attach to a structural member within a vehicle interior during volume production.

SUMMARY OF THE INVENTION

Responsive to the deficiencies of the prior art, the present invention provides a light weight interior trim component to cover structural members and provide an integrally molded swept arch structure which is elastically and plastically deformable in response to imposition of a load.

In particular, an object of the present invention is to provide an energy absorbing trim assembly for covering an inner face of a structural member of a vehicle defining a passenger compartment having an elongated wall portion with a longitudinal axis. The wall portion positionable in a covering relationship over the structural member inner face. A plurality of swept arch members are arrayed along the longitudinal axis in a laterally spaced relationship with respect to the structural member inner face. The arch members being elastically deformable in response to imposition of a load substantially normal to the structural member and plastically deformable upon contact with the structural member to further distribute the load.

A further object is to provide the aforesaid trim assembly with integrally molded arch members that are defined by an apex area, a long leg, and a short leg whereby the resistance of the arches to deformation is greater proximate to the apex.

A still further object is to provide the aforesaid apex area arranged in a facing relationship with respect to the load within the vehicle passenger compartment. The apex area having an enhanced cross-sectional area and the legs extending toward the structural member inner face. The legs being tapered in depth from the apex area to the structural member inner face.

Another object of the present invention is to provide the aforesaid trim assembly with a plurality of integrally molded mounting pedestals arrayed along the wall portion longitudinal axis and carried in laterally spaced relationship with respect to the structural member inner face. The pedestals being plastically deformable in response to imposition of a load substantially normal to the structural member Yet another object is to provide the aforesaid trim assembly wherein said mounting pedestals are defined by an apex area, a first leg, and a second leg whereby the resistance of the pedestals to deformation is greater proximate to the apex area. The trim assembly further comprising a mounting clip to secure said trim assembly to said structural member and at least one locating pin having a height greater than the mounting pedestal for locating said trim assembly prior to engagement of said mounting clip.

BRIEF DESCRIPTION OF THE DRAWINGS

Other advantages and features of the energy absorbing swept arch for interior trim of the present invention will be apparent to those skilled in the automotive vehicle arts upon reading the following description with reference to the accompanying drawings, in which:

FIG. 1 is a fragmentary perspective view of a passenger compartment of an automotive vehicle showing a trim assembly of the present invention covering a front pillar post;

FIG. 2 is an enlarged rear perspective view of a portion of the interior trim according to the present invention;

FIG. 3 is an enlarged sectional view taken along the line 3—3 of FIG. 1;

FIG. 4 is an enlarged sectional view taken along the line 4—4 of FIG. 2;

FIG. 5 is an enlarged sectional view taken along the line 5—5 of FIG. 4 showing the energy absorbing trim member installed in a structural member; and FIG. 6 is an enlarged sectional view taken along the line 6—6 of FIG. 4 showing the energy absorbing trim member installed in a structural member.

FIG. 7 is an enlarged perspective view showing an energy absorbing trim member installed in a structural member similar to FIG. 6 but having only the clip attachment peg.

DESCRIPTION OF THE PREFERRED EMBODIMENTS

Turning now to the drawings, particularly to FIG. 1 thereof, a passenger compartment of an automotive vehicle 10 in which a structural member 12 of the vehicle is shown adjacent to a window 14 and including an energy absorbing trim assembly 16 according to the present invention. The illustrated embodiment displays the trim assembly 16 associated with the A-pillar of the vehicle with it being understood that the present invention is suitable for any pillar, header, roof side rail, or other structural member that is commonly covered by injected molded plastic material to provide aesthetic appeal to a vehicle interior.

In the illustrated embodiment of FIG. 2, an enlarged rear perspective view of a portion of the energy absorbing trim assembly 16 according to the present invention is shown. The energy absorbing trim assembly 16 includes an elongated wall portion 18 having a longitudinal axis 19. The wall portion 18 is positionable in a covering relationship over a structural member 12. A plurality of swept arch members 20 and mounting pedestals 22 are further arrayed along the longitudinal axis 19 in laterally spaced relationship with respect to the structural member 12. The mounting pedestals 22 further includes a locating pin 24 and a clip attachment peg 26 for attaching a mounting clip 30. The mounting clip 30 is operable to secure the trim assembly 16 to a structural member 12. The swept arch members 20 and mounting pedestals 22 can be molded integral to the elongated wall portion 18 or separately molded and attached thereto by a suitable adhesive or the like.

In the illustrated embodiment of FIG. 3, an enlarged sectional view taken along the line 3—3 of FIG. 1 displays a swept arch member 20 in relationship to a structural member 12 having an inner face 29. The swept arch members 20 are arrayed along the longitudinal axis 19 in laterally spaced relationship with respect to a structural member 12 to cover an area responsive to imposition of a dynamic load. The unique geometry of the swept arch member 20 efficiently utilizes the amount of available space to absorb a dynamic load inflicted substantially normal to a structural member inner face 28.

Material selection for the swept arch members 20 includes but is not limited to plastics, aluminum, and mild steel dependent on location, available space, and weight requirements of the specified vehicle. The present invention's applicability to a varied choice of materials provides for the associated control of elastic and plastic deformation characteristics to further tailor the swept arch member's 20 responsiveness to a dynamic load. The various materials may be selectively arrayed along the wall portion 18 to again provide for a desired responsiveness at particular locations along the longitudinal axis 19.

The geometry and spacing of the swept arch members 20 can be further varied to specifically accommodate a large range of impact loads, angles and structural components. The geometry of the swept arch members 20 of the present invention may be defined by a polynomial having a degree of two providing a continuously compliant swept arch. The swept arch members 20 being defined by an apex area 30, a long leg 32, and a short leg 34. The arch members 20 provide the unique feature of spanning a specified air gap and furnishing resistance to deformation that is greater proximate to the apex area 30. An enhanced cross sectional-area at the apex area 30 furthers the potential to tailor the responsiveness of the swept arch member 20. In combination with the enhanced apex area 30 the legs may also be tapered in depth and or width from the apex area 30 to each of the leg ends again providing a further opportunity to specifically tailor the arch members 20 to an anticipated dynamic load.

The performance characteristics of the energy absorbing trim 16 are best shown by how the swept arches 20 perform under dynamic loading. In operation, a dynamic load is absorbed by the trim assembly 16 in a manner to reduce acceleration through elastic and plastic deformation. The elastic and plastic deformation sequence operates in a controlled manner so as to reduce the magnitude of acceleration and thereby protect the vehicle occupants.

Upon imposition of a dynamic load, the first portion of the deformation sequence involves utilizing the swept arch 20 geometry to distribute the load across the span of the arch members 20. As the swept arch 20 elastically deforms through the distance between the apex area 30 and the structural member inner face 29 it absorbs kinetic energy. Once the trim assembly has stroked through the distance between the apex area 30 and the structural member inner face 29 the arch members 20 contact the structural member inner face 29. In the final sequence of deformation, the arch members 20 undergo plastic deformation to further absorb the remaining kinetic energy. It may therefore be seen that the energy absorption sequence may be varied by the material and geometry of the swept arch members 20 to specifically tailor the trim assembly 16 to accommodate a large range of impact loads and angles.

The mounting of the energy absorbing trim assembly 16 to a structural member inner face 29 is best shown in FIGS. 4–7. FIG. 4 is an enlarged perspective view of a pedestal 22 having an integrally molded locating pin 24 and clip attachment peg 26. FIG. 7 is an enlarged perspective view of a complementary pedestal 22' having only a clip attachment peg 26.

FIGS. 5 and 6 are enlarged sectional views taken along the lines 5—5, and 6—6 of FIG. 4 showing the energy absorbing pedestal members 22,22'. The pedestals 22,22' being plastically deformable in response to imposition of a load substantially normal to a structural member 12. The geometry of the pedestals 22,22' are defined by an apex area 40,40', and first and second legs 42,42' whereby the resistance of said pedestals to deformation is greater proximate to said apex area 40,40'. The pedestals 22,22' thereby acting in combination with the swept arch members 20 to further reduce the magnitude of acceleration and thereby aid in protection of the vehicle occupants.

The pedestals 22,22' including at least one locating pin 24 and clip attachment peg 26 for directly attaching the trim assembly 16 to a structural member inner face 29. The locating pin 24 having a height greater than the mounting pedestal 22 positions the trim assembly 16 prior to engagement of the mounting clip 28. The locating pin 24, and mounting clip 28 previously attached to the clip attachment peg 26, correspond to holes 36,38 located in the structural member inner face 29. The trim assembly 16 is thereby simply snapped or clipped in place by inserting the locating pin 24 into a corresponding hole 36 in the structural member inner face 29 to accurately position the trim assembly 16. The mounting clip 28 providing rapid and efficient mounting during volume automobile production.

While only certain embodiments of the present invention are disclosed, others may be possible without departing from the scope of the following claims.

We claim:

1. An energy absorbing trim assembly for covering an inner face of a structural member of a vehicle defining a passenger compartment, said trim assembly comprising:

an elongated wall portion having a longitudinal axis, said wall portion postionable in a covering relationship over said inner face of said structural member; a plurality of independent, spaced apart, swept arch members and integrally molded with said wall portion and arrayed along said longitudinal axis of said wall portion in laterally spaced relationship with respect to said inner face of said structural member;

said arch members having a C-shaped configuration positioned transverse to said longitudinal axis and defined by an apex area, a short leg, and a long leg in opposing facing relationship to said short leg;

said arch members being elastically deformable in response to imposition of a load substantially normal to said structural member; and upon contact with said structural member, said arch members being plastically deformable to further distribute said load.

2. An energy absorbing trim assembly according to claim 1, wherein said arch members are further defined by said short leg extending from said apex area to a first end and said long leg extending from said apex area opposite said short leg to a second end displaced further from said apex area than said first end, a long leg, and a whereby the resistance to deformation of said arch members is greater proximate to said apex area between said first and second ends.

3. An energy absorbing trim assembly according to claim 2, wherein said apex area is arranged in facing relationship with respect to said inner face of said structural member and opposing said load within said vehicle passenger compartments.

4. An energy absorbing trim assembly according to claim 3, wherein said arch members have a generally rectangular cross-sectional area in said apex area.

5. An energy absorbing trim assembly according to claim 4, said legs of said arch members extend from said apex area toward said inner face of said structural member.

6. An energy absorbing trim assembly for covering an inner face of a structural member of a vehicle defining a passenger compartment, said trim assembly comprising:

an elongated wall portion having a longitudinal axis, said wall portion positionable in a covering relationship over said inner face of said structural member;

a plurality of independent mounting pedestals integrally molded with said wall portion and arrayed along said longitudinal axis of said wall portion carried in laterally spaced relationship with respect to said inner face of said structural member;

said pedestals being plastically deformable in response to imposition of a load substantially normal to said inner face of said structural member; and said pedestals defined by a pair of spaced apart first and second legs projecting transversely from said wall portion to distal ends interconnected by an apex area whereby the resistance to deformation of said pedestals is greater proximate to said apex area.

7. An energy absorbing trim assembly according to claim 6, further comprising a clip attachment peg extending from said apex area of said pedestals and a mounting clip operatively connected between said clip attachment peg and said inner face of a said structural mounting to secure said trim assembly to said structural member.

8. An energy absorbing trim assembly according to claim 7, further comprising at least one locating pin extending from said apex area of said pedestal and having a height greater than said clip attachment peg on said mounting pedestal for locating said trim assembly with said inner face of said structural member prior to engagement of said mounting clip.

9. An energy absorbing trim assembly for covering an inner face of a structural member of a vehicle defining a passenger compartment, said trim assembly comprising:

an elongated wall portion having a longitudinal axis, said wall portion positionable in a covering relationship over said inner face of said structural member;

a plurality of independent, spaced apart, swept arch members integrally molded with said wall portion and arranged along said longitudinal axis in laterally spaced relationship with respect to said inner face of said structural member, said arch members having a C-shaped configuration positioned transverse to said longitudinal axis and defined by an apex area, a long leg, and a short leg in opposing facing relationship to said long leg whereby the resistance of said arches to deformation is greater proximate to said apex area;

said arch members being elastically deformable in response to imposition of a load substantially normal to said structural member;

upon contact with said structural member, said arch members being plastically deformable to further distribute said load;

a plurality of independent mounting pedestals integrally molded to said wall portion and and arrayed along said longitudinal axis carried in a laterally spaced relationship with respect to said inner face of said structural member; and said pedestals being plastically deformable in response to imposition of a load substantially normal to said structural member.

10. An energy absorbing trim assembly according to claim 9, wherein said apex area is arranged in facing relationship with respect to said load within said vehicle passenger compartment.

11. An energy absorbing trim assembly according to claim 10, wherein said arch members have a generally rectangular cross-sectional area in said apex area.

12. An energy absorbing trim assembly according to claim 11, wherein said legs of said arch members extend from said apex area toward said inner face of said structural member, said legs tapering in depth from said apex to said structural member inner face.

13. An energy absorbing trim assembly according to claim 12, wherein said mounting pedestals are defined by a pair of spaced apart first and second legs projecting transversely from said wall portion to distal ends interconnected by an apex area whereby the resistance of said pedestals to deformation is greater proximate to said apex area.

14. An energy absorbing trim assembly according to claim 13, further comprising a clip attachment peg extending from said apex area of said pedestals and a mounting clip operatively connected between said clip attachment peg and said inner face of said structural member to secure said trim assembly to said structural member.

15. An energy absorbing trim assembly according to claim 14, further comprising at least one locating pin extending from said apex area of said pedestal and having a height greater than said clip attachment peg on said mounting pedestal for locating said trim assembly with said inner face of said structural member prior to engagement of said mounting clip.

* * * * *